T. E. TURNER & O. J. HEATH.
HAY BALING PRESS.
APPLICATION FILED MAR. 4, 1912. RENEWED FEB. 29, 1916.

1,237,586.

Patented Aug. 21, 1917.
4 SHEETS—SHEET 2.

Witnesses:
F. W. Hoffmeister.
C. C. Palmer.

Inventors:
Thomas E. Turner
and
Ora J. Heath.
By E. W. Burgess
Attorney

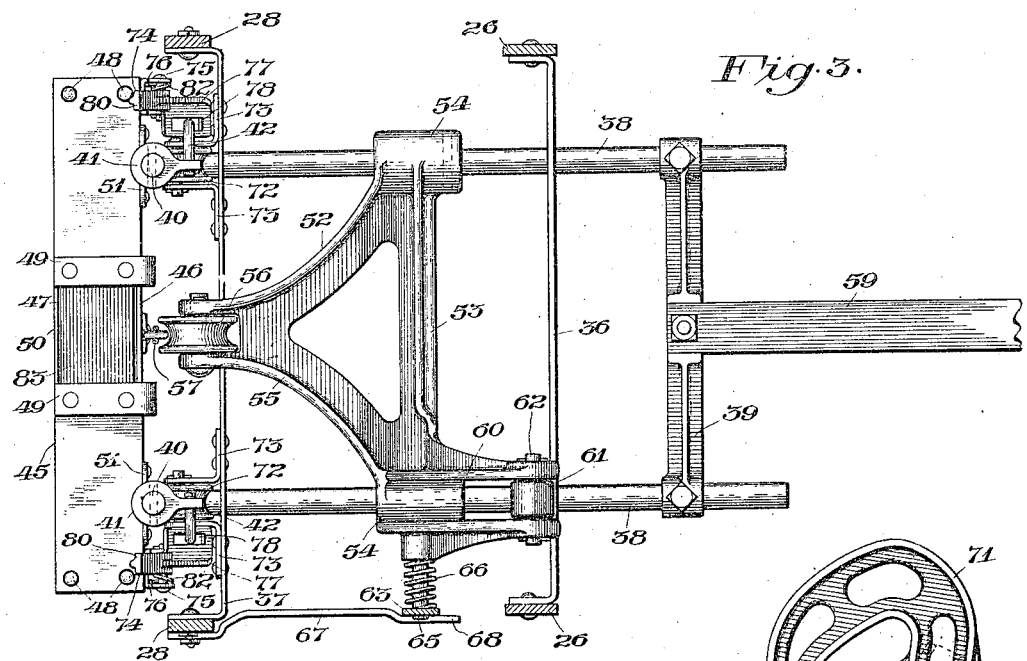
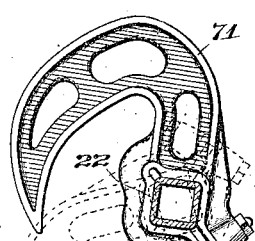
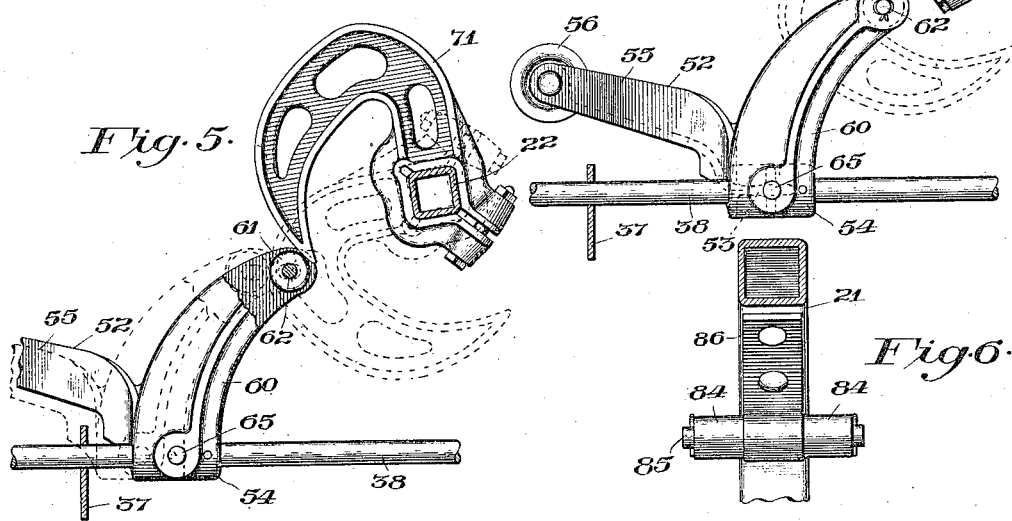
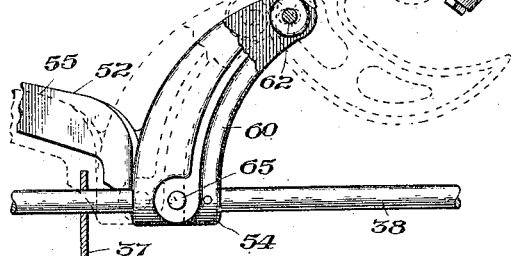

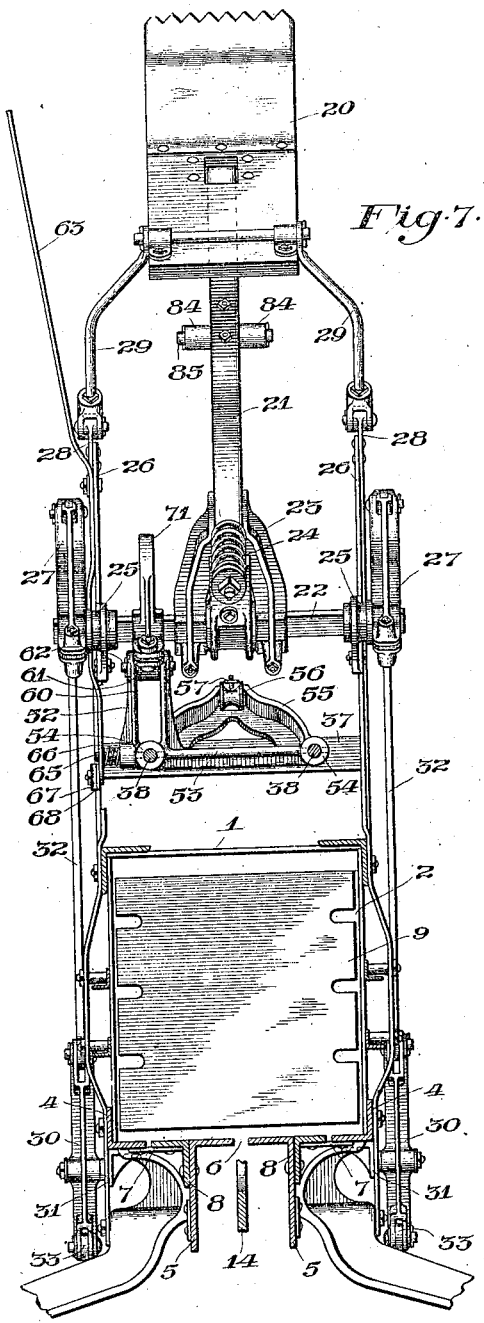
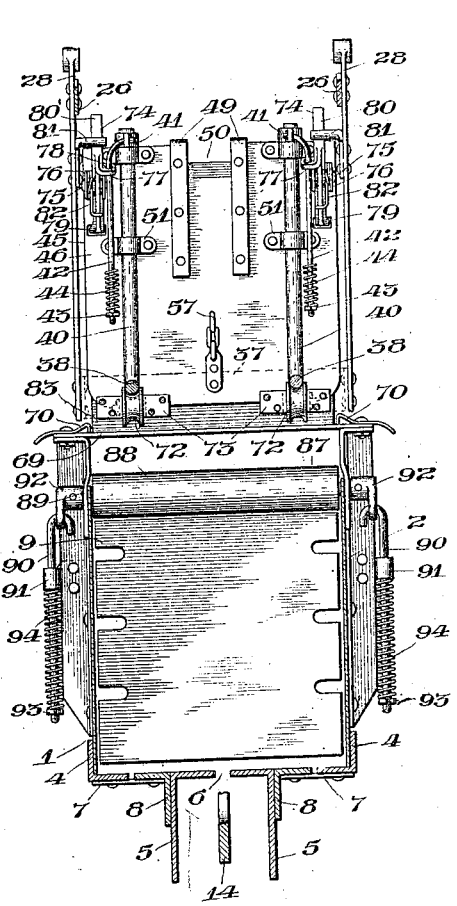

UNITED STATES PATENT OFFICE.

THOMAS E. TURNER AND ORA J. HEATH, OF SPRINGFIELD, OHIO, ASSIGNORS TO INTERNATIONAL HARVESTER COMPANY OF NEW JERSEY, A CORPORATION OF NEW JERSEY.

HAY-BALING PRESS.

1,237,586.   Specification of Letters Patent.   Patented Aug. 21, 1917.

Application filed March 4, 1912, Serial No. 681,494.   Renewed February 29, 1916.   Serial No. 81,293.

*To all whom it may concern:*

Be it known that we, THOMAS E. TURNER and ORA J. HEATH, citizens of the United States, residing at Springfield, in the county of Clark and State of Ohio, have invented certain new and useful Improvements in Hay-Baling Presses, of which the following is a specification.

Our invention relates to baling presses having a reciprocating plunger, a swinging feeder and a division block inserter, and in particular to an improved form of casing into which the division block is inserted, and to means whereby said casing is moved to a position permitting the block to be released from the casing and deposited in the compression chamber, and also to the means for performing that function; the object of our invention being to provide a construction positive and efficient in operation, and strong and simple in its parts. We attain these objects by means of mechanism one embodiment of which is illustrated in the accompanying drawings, in which—

Fig. 3 is a top plan view of part of the division block inserting mechanism;

Fig. 4 is a detached detail of part of the feeder and block inserting mechanism and designed to show the manner whereby the latter is actuated by a rocking movement of part of the feeder operating mechanism;

Fig. 5 is a view similar to Fig. 4, and represents the same parts in a different position of operation;

Fig. 6 represents a detached detail of the block inserting mechanism;

Fig. 7 is a partially sectional front elevation of Fig. 1; and

Fig. 8 is a cross section along line A—B of Fig. 1.

The same reference characters designate like parts throughout the several views.

Figure 1:
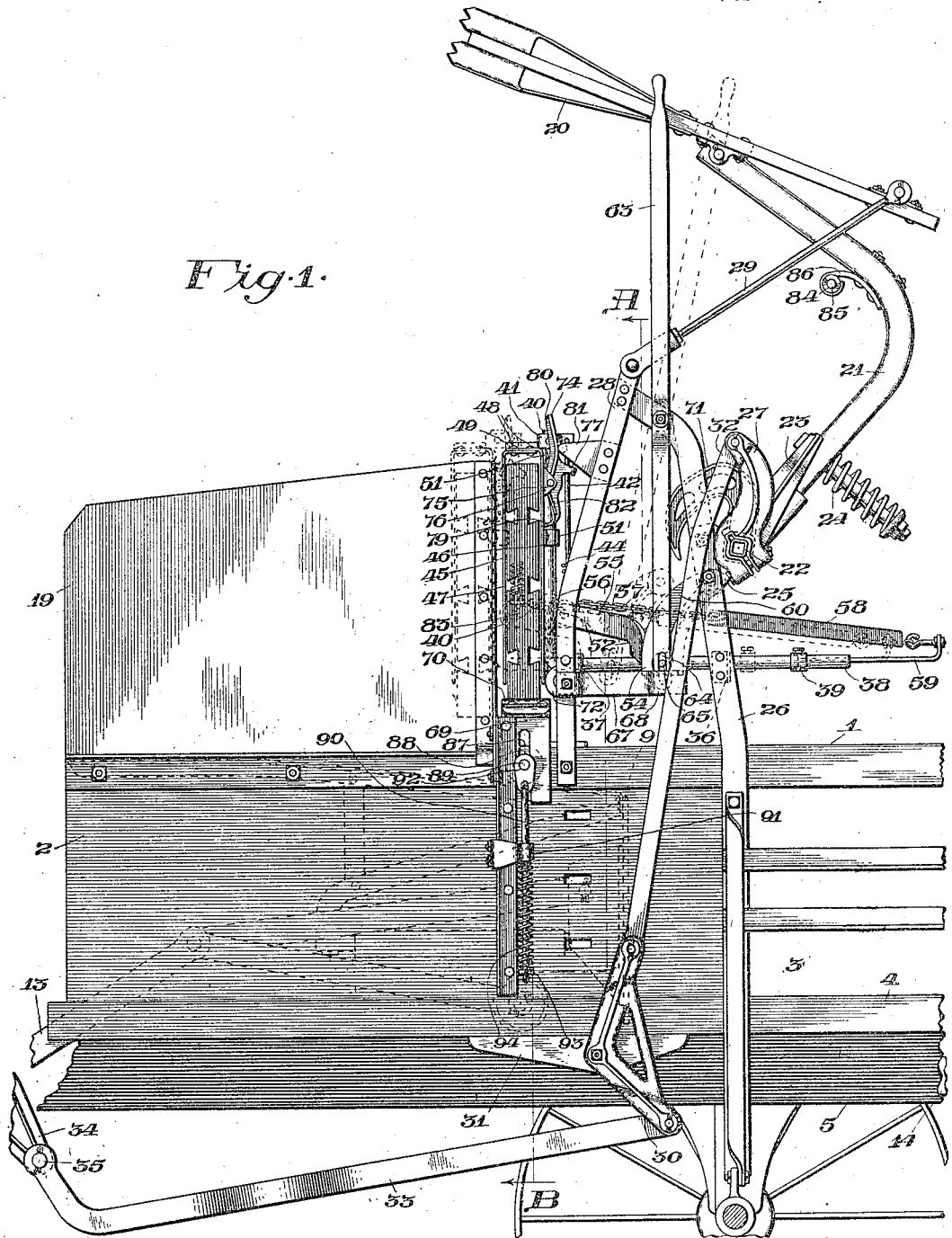
Figure 1 represents a side elevation of part of a baling press having our invention forming a part thereof.
Figure 2:
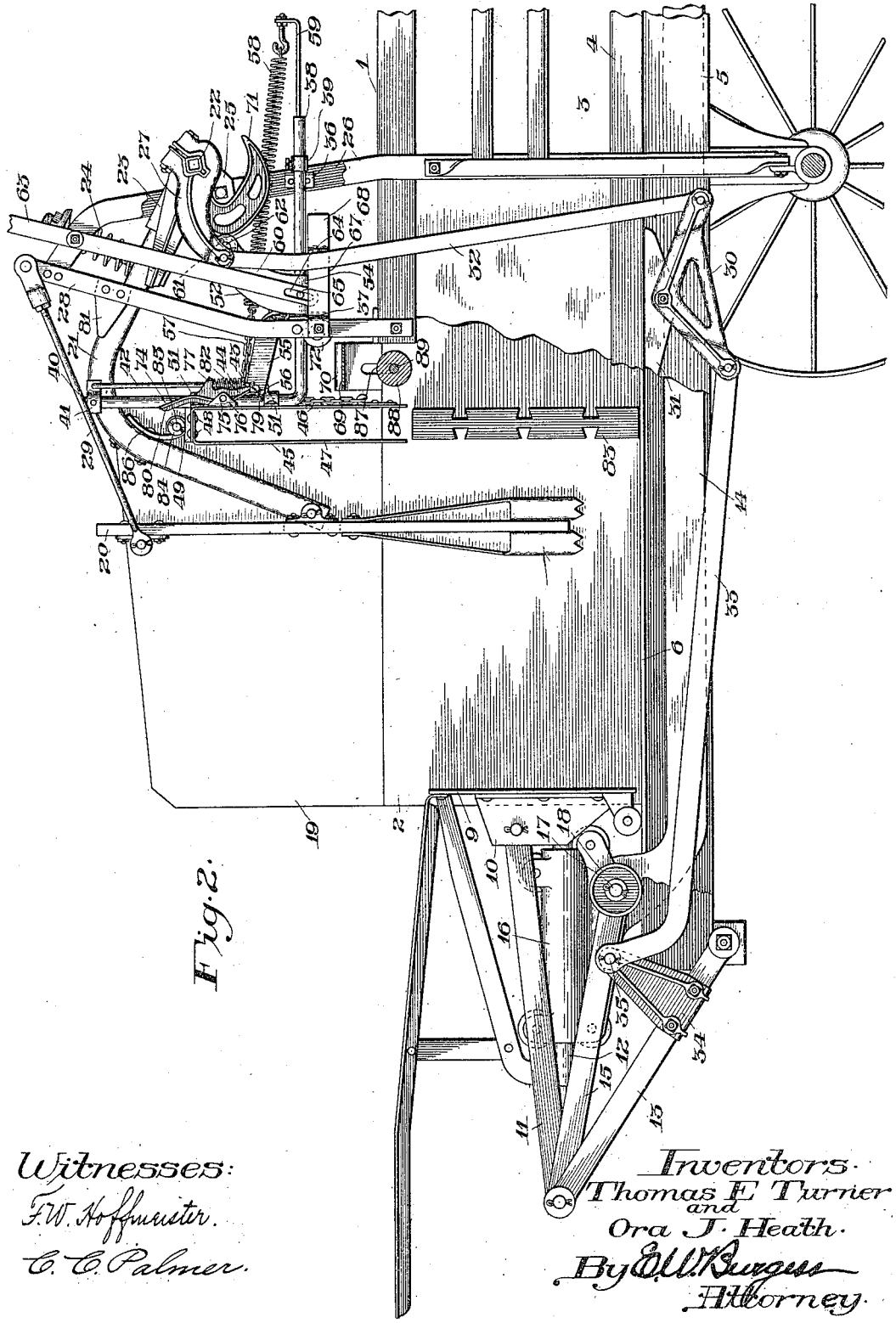
Fig. 2 is a view similar to Fig. 1 and designed to illustrate the connections between the actuating means for the plunger, the feeder and block inserting mechanism.

1 represents the frame of a baling machine, 2 the compression chamber at the rear end thereof, and 3 the baling chamber. The bottom of the frame is formed of the corner angle bars 4, the centrally arranged, inverted, opposing angle bars 5, spaced apart in a manner forming an inverted channel with a slot 6 in the bottom thereof, and the plate 7 and angle bars 8, which support and secure together the bars 4 and 5. The plunger head consists of the single plate 9, having a pair of bracket members 10 secured to the center thereof, the brackets being spaced apart in a manner to receive between them one end of plunger bar 11, that is pivotally connected therewith, and near the bottom of the plunger head, and directly beneath the bar 11 is secured an inwardly projecting stem 12. The opposite end of the plunger bar 11 is pivotally connected with one end of oppositely disposed toggle bars 13, having opposite ends thereof pivotally connected with the rear end of the frame of the machine, constituting a toggle connection between the baler frame and the plunger head. A plunger draw bar 14 extends forwardly beneath the baler frame and has one end thereof connected with a toggle joint formed by the bar 11 and the toggle bars 13 by means of oppositely disposed links 15. The rear end of the draw bar is secured to a guide block 16, which is provided with a longitudinally arranged bore adapted to slidably receive the stem 12 of the plunger head. The pin 17 that secures the draw bar to the guide block is preferably made to constitute the pivotal axis of rollers 18, as well as the pivotal axis between the end of the draw bar and the links 15. The rollers 18 move along the upper side of the bars 5 and support the plunger head.

19 represents the feed hopper communicating with the compression chamber, and 20 a swinging feeder head that is pivotally connected intermediate the ends thereof to one end of a curved arm 21, the opposite end of the curved arm being yieldingly connected with a rock shaft 22 by means of a bracket member 23 and a compression spring 24 in a well-known way, whereby the feeder arm may yield when meeting an unyielding obstruction in the compression chamber. The rock shaft is journaled in bearings 25 secured to vertically arranged members 26, having their lower ends secured to opposite sides of the bale chamber, and 27 represents lever arms secured to opposite ends of said rock shaft. The members 26 extend beyond the bearings 25, and have the curved rearward upper ends thereof secured to the upper ends of brace members 28, the lower ends of said brace members being secured to the frame of the machine, and 29 represents links having one end thereof pivotally connected with the upper ends of members 28, and the opposite ends thereof with the feeder head 20, whereby the position of the latter is controlled as it moves into and from the compression chamber.

30 represents bell crank levers pivotally mounted upon bracket members 31 secured to the bed frame of the machine upon opposite sides thereof, and having one arm connected with the lever arms 27 by means of links 32, and the remaining arms thereof connected with the front ends of longitudinally arranged bars 33, and 34 represents bracket members secured to the lower ends of the toggle bars 13 adjacent the pivotal connection thereof with the frame of the machine, upon opposite sides thereof, the bracket members being provided with laterally projecting studs 35 whereby said brackets are pivotally connected with the rear upturned ends of the bars 33.

36 represents a transverse bar having opposite ends thereof secured to the vertically arranged members 26 of the feeder mechanism, and 37 represents a transverse bar having opposite ends thereof secured to frame members 28, each of said bars being provided with openings near opposite ends thereof that slidably receive longitudinally and horizontally arranged bars 38, having the front ends thereof connected by means of a cross tie member 39, and the rear ends thereof provided with upturned vertical members 40, and 41 represents clips secured to the upper ends of the members 40. 42 represents pendent links having the upper ends thereof turned laterally and received by openings in the clips, and the lower ends thereof provided with adjusting nuts 43 and buffer springs 44.

45 represents a division block carrying case including vertically arranged front and rear plate members 46 and 47, respectively, spaced apart in a manner to receive a division block between them, and arranged transversely across the machine, the upper ends of said plates being turned inward at right angles to the bodies thereof and secured together by means of rivets 48, and provided with reinforcing straps 49 at each side of a centrally arranged gap 50 through the top of the case. 51 represents bracket members secured to the front side of the case and provided with vertically arranged openings whereby the case is slidably mounted upon the vertical members 40 of the bars 38.

52 represents a bracket including a transverse bar 53, having longitudinally arranged sleeve portions 54 at opposite ends thereof whereby the bars are secured to the bars 38 between the transverse bars 36 and 37. 55 represents a rearwardly projecting arm having a sheave 56 journaled upon a cross pin at its rear end adjacent the block carrying case, over which a chain 57 passes, one end of the chain being connected with said case and the opposite end thereof with the rear end of a tension spring 58, the opposite end of said spring being connected with the front end of a bar 59, the rear end of bar 59 being secured to the cross tie member 39 intermediate the ends thereof, the spring being operative to normally retain the block carrying case in an elevated position above the bale chamber. 60 represents a forwardly projecting arm integral with the bracket 52, at one side thereof, that is provided with a roller 61 journaled upon a cross pin 62. 63 represents a hand lever pivotally connected intermediate its ends with one of the members 26, and having a slotted opening 64 at its lower end that receives a laterally projecting stud 65 carried by the bracket 52, and 66 represents a coiled spring encircling the stud and operative to press the lower end of said lever outward against a plate member 67, said plate having one end thereof secured to one of the frame members 28, and the opposite end thereof provided with an offset portion 68 that engages with the hand lever when the lower end thereof is swung forward in a manner to move the block carrying case in position to receive a block, as shown by full lines in Fig. 1, and when in such position the case is in close proximity to a raised bench 69 secured to the upper side of the frame of the press. The block may be placed in the case from either side of the machine by sliding it through the open end of the case, and 70 represents stop members secured to opposite ends of the bench 69 and operative to properly gage the position of the block within the case. 71 represents a wing cam member secured to the feeder actuating rock shaft 22 and adapted to swing downward when the shaft is rocked in a rearward direction and engage the rear side of the roller 61 in a manner preventing a rearward movement of the block carrier during the swinging movement of the feeder head, and when it is desired to insert a block in the compression chamber the operator moves the upper end of the hand lever forward while the feeder head is in a raised position, and thus moves the block and carrier case off from the bench 69 and over the compression chamber; but if the case should not have reached the limit of its rearward movement before the feeder head has reached a predetermined point of its path of descent, the wing cam 71 engages with the front side of the roller 61, as shown in Fig. 5 and pushes the block carrier to its proper position. The force required to move the carrier will be reduced by reason of the rear ends of the bars 38 resting upon rollers 72 journaled in brackets 73 secured to the bar 37. 74 represents latch members pivotally connected with the front side of the block carrying case, near its upper side, by means of pin 75 and ear members 76. The latches are provided with forwardly projecting wings 77 above the pivotal axis of the latch, having slotted openings 78 therein that receive the pendent links 42 in a slidable manner. The lower ends of the latches are turned rearward in the form of hooks 79 that are received by openings in the side of the case, and the upper ends thereof are provided with curved head portions 80 that engage with bracket members 81 secured to the brace members 28 of the feeder carrying frame in a manner to swing the hook portions of the latches forward and away from the case and against the resistance of springs 82 that are operative between the side of the case and the latch in a manner to swing the latches in an opposite direction when they are released from engagement with the bracket members 81.

In operation the division block 83 is inserted in the carrier case, and when the feeder arm is in an elevated position the operator swings the hand lever forward, as shown by dotted lines in Fig. 1, and thereby slides the case carrier rearward. As the case is moved rearward the latches 74 are removed from engagement with the bracket members 81, and the springs 82 cause them to engage with one of the wire channels in the division block in a manner preventing the block from falling until the feeder arm is rocked downward sufficient to cause rollers 84, journaled upon opposite ends of a pin 85, carried by a bracket 86, secured to the feeder arm, to engage with the case at opposite sides of the gap and move it downward against the force of spring 58 until the latches 74 engage with buffer spring 44 carried by the pendent links 42 in a manner to release said latches from engagement with the block, and the latter is free to fall into the compression chamber, and as the feeder head is withdrawn from the chamber the spring 58, through the chain 57, causes the case to follow the upward movement of the rollers 84 until it is above the plane of bench 69, and the operator then swings the hand lever rearward for the purpose of returning the case to its initial position above the bench 69.

87 represents a tucker, and includes a roller 88 rotatably mounted upon a transverse rod 89 at the rear end and at the upper side of the compression chamber, below the bench 69, the ends of the bench and the side walls of the chamber being provided with vertically arranged slotted openings through which the rod 89 extends, the rod and roller being permitted to rise and fall, said movement being controlled by means of pendent links 90, slidably connected with the walls of the compression chamber by means of bearing loops 91 secured to opposite sides of the frame of the machine, the upper ends of the links being provided with hooks that are received by openings in downwardly extending ears integral with sleeves 92 that are secured to opposite ends of the rod 89, and the lower ends provided with adjusting nuts 93, and 94 represents compression springs encircling the links and operative between the nuts and loops 91 in a manner to yieldingly hold the tucker roller in engagement with the charge of hay as it is being pressed into the bale chamber by the presser head.

It is to be noted that in our improved construction the block carrying case is only movable into block setting position when the feeder head occupies a predetermined position, and that means are provided rendering the actuating mechanism for the case inoperative when the feeder head is in a predetermined position. Attention is further directed to the fact that the feeder head and compressor head coöperate with the controlling mechanism for the block carrying case in such a manner as to prevent a block being caught by the compressor head as the former is moving down into the compression chamber. It is also to be noted that automatic means are provided for returning the block carrying case to its initial position and that automatic means are provided for releasing a block therefrom in a predetermined position of the case; these latter means being likewise returned to their initial positions upon the release of the block. These and other advantages of our improvement will be apparent to one skilled in this art.

While we have in this application specifically described one form in which our invention may be used in practice, it is, of course, to be understood that the form chosen for purposes of illustration may be modified without departing from the spirit of the invention.

What we claim as our invention, and desire to secure by Letters Patent, is:

1. In a baling press, a frame, a block carrying case movable with respect thereto, and mechanism retaining a block therein automatically released by said case upon the movement of the latter into a predetermined position.

2. In a baling press, a frame, a block carrying case movable with respect thereto, mechanism retaining a block therein automatically released by said case upon the movement of the latter into a predetermined position, and means for automatically returning the parts to their initial positions.

3. In a baling press, a frame having a compression chamber therein, mechanism for feeding material to said chamber, a block carrying case supported by said frame, mechanism for releasing a block from said case, and means rendering said block releasing mechanism inoperative in a predetermined position of said feeding mechanism.

4. In a baling press, a frame having a compression chamber therein, mechanism for feeding material to said chamber, a block carrying case carried on said frame, means for moving said case with respect to said frame; and means rendering said case moving mechanism inoperative in a predetermined position of said feeding mechanism.

5. In a baling press, a frame having a compression chamber therein, a block holding case movable with respect thereto, mechanism for feeding material to said chamber, and means intermediate said case and said feeding mechanism rendering said case immovable in a predetermined position of said feeder mechanism.

6. In a baling press, a frame having a compression chamber therein, intermittently actuated feeder mechanism movable into said compression chamber, and block setting mechanism operatively connected to said feeder mechanism and rendered inoperative in a predetermined position of the latter.

7. In a baling press, a frame having a compression chamber therein, a plunger movable in said chamber, a feeder movable therein, manually operable block setting mechanism, and means controlled by the movement of said feeder and operating in timed relation with said plunger controlling the operation of said block setting mechanism.

8. In a baling press, a frame having a compression chamber therein, a feeder arm pivoted thereon and operable to pack material in said chamber, a block carrying case, means for moving the same longitudinally of said frame, and automatic means rendering said last mentioned means inoperative in a predetermined position of said feeder arm.

9. In a baling press, a frame having a compression chamber therein, a feeder head pivoted thereon and operable to pack material in said chamber, a cam member movable with said feeder head, a block carrying case, and mechanism for moving said case longitudinally of said frame locked against movement in a predetermined position of said feeder head by engagement with said cam.

10. In a baling press, a frame having a compression chamber therein, a block carrying case movable with respect to said frame, a feeder head carried on said frame and engaging said case, and automatic mechanism for releasing a block at a predetermined position in the movement of said case.

11. In a baling press, a frame having a compression chamber therein, a compressor head movable into said chamber, a feeder head movable into said chamber, block setting mechanism carried on said frame, and means operatively connected between said compressor head and said feeder head rendering said block setting mechanism inoperative during the compression stroke of said compressor head.

12. In a baling press, a frame having a compression chamber therein, a block setting case carried thereon, means for moving said case longitudinally of said frame and toward said compression chamber, automatic mechanism retaining a block therein and operable to release the block therefrom in a predetermined position of said case, automatic means returning said case to its initial position, and automatic means returning said block retaining mechanism to its original position.

13. In a baling press, a frame having a compression chamber therein, a movable block carrying case mounted thereon above said chamber, feeder mechanism, means for manually moving the block carrying case, and automatic means movable during the operation of said feeder mechanism for moving said block carrying case to block dropping position.

14. In a baling press, a frame having a compression chamber therein, a movable block carrying case mounted thereon above said chamber, feeder mechanism, means for giving the block carrying case an initial movement, and means operatively connected to said feeder mechanism for automatically moving said block case to block dropping position.

15. In a baling press, a frame having a compression chamber therein, a block carrying case reciprocably mounted thereon above said chamber, feeder mechanism, means for giving the case an initial movement, and means automatically movable during the operation of said feeder mechanism for reciprocating said block case.

16. In a baling press, a frame having a compression chamber therein, a block carrying case reciprocably mounted thereon above said chamber, feeder mechanism, means for manually moving said case, means automatically movable during the operation of said feeder mechanism for reciprocating said block case, and coöperating means movable with said feeder mechanism controlling the dropping of a block from said case.

17. In a baling press, a frame having a compression chamber therein, a block carrying case reciprocably mounted thereon above said chamber, feeder mechanism, means automatically movable during the operation of said feeder mechanism for reciprocating said block case in one direction, and separate automatic means for returning said block case to its normal position.

18. In a baling press, a frame having a compression chamber therein, plunger mechanism movable in said chamber, a block case reciprocable longitudinally of said frame above said chamber, means for manually moving said case, and means operatively connected to said plunger mechanism for reciprocating said case.

19. In a baling press, a frame having a compression chamber therein, plunger mechanism movable in said chamber, feeder mechanism feeding material to said chamber and operatively connected to said plunger mechanism, a block case reciprocable longitudinally of said frame above said chamber, means for giving the block case an initial movement, and means operatively connected to one of said mechanisms for reciprocating said case.

20. In a baling press, a frame having a compression chamber therein, feeding mechanism including a feeder head for feeding material to said chamber, a block case reciprocable longitudinally on said frame above said chamber, means to give the block case an initial movement, and means whereby said block case is reciprocated over said chamber as said feeder head moves toward feeding position.

21. In a baling press, a frame having a compression chamber therein, feeding mechanism including a feeder head feeding material to said chamber, a block case reciprocable longitudinally on said frame above said chamber, means for locking a block in said case in dropping position, means whereby said block case is reciprocated over said chamber as said feeder head moves toward feeding position, and means on said feeder head controlling the dropping of a block from said case.

22. In a baling press, a frame having a compression chamber therein, feeding mechanism including a feeder head feeding material to said chamber, a block case reciprocable longitudinally of said frame above said chamber, controlling means for giving the block case an initial movement, means whereby as said feeder head moves to feeding position said block case is reciprocated over said chamber, and means carried on said feeder head controlling the dropping of a block from said case.

23. In a baling press, a frame having a compression chamber therein, feeding mechanism including a feeder head feeding material to said chamber, a block case reciprocable longitudinally of said frame above said chamber, controlling means for moving the block case, and coöperating means operatively connected to said feeder head for reciprocating said case after an initial operation of said controlling means.

24. In a baling press, a frame having a compresion chamber therein, feeding mechanism including a feeder head feeding material to said chamber, a block case reciprocably mounted on said frame above said chamber, means operatively connected to said feeder head for reciprocating said case to block dropping position, and manually controlled means independent of the feeding mechanism for rendering said automatic reciprocating mechanism operative.

25. In a baling press, a frame having a compression chamber therein, block case mechanism on said frame movable relatively thereto into position to drop a block in said compression chamber, mechanism carried on said frame for adjusting said block case mechanism toward its block dropping position, mechanism including a feeder head for packing material in said compression chamber, and automatic means movable with said feeder head controlling the movement of said block case mechanism and adjusting mechanism.

26. In a baling press, a frame having a compression chamber therein, a block case mounted thereon and movable longitudinally thereof over said chamber, hand operated lever mechanism for moving said block case with respect to said frame, packing mechanism including a feeder head for packing material in said chamber, and means operating in timed relation with said feeder head for automatically insuring the completion of the movement of said block case by said lever mechanism or locking said lever mechanism against movement in different predetermined positions of said block case.

27. In a bailing press, a frame having a compression chamber therein, mechanism including a feeder head pivoted on said frame for packing material in said chamber, manually reciprocable block case mechanism including a block case movable over said chamber to deliver a block therein and a member movable therewith, and a winged cam automatically movable with said feeder head engageable with said member either to reciprocate said block case bodily or lock the same against movement in different relative positions of said feeder head and block case.

28. In a baling press, a frame having a compression chamber therein, mechanism including a feeder head pivoted on said frame for packing material in said chamber, a rock shaft on said frame carrying said feeder head, a hooked cam carried on said rock shaft and movable with said feeder head, and manually adjustable block case mechanism carried on said frame operable by said cam toward block dropping position when in one predetermined position with respect to said feeder head and locked by said cam against movement toward block dropping position when in another predetermined position with respect thereto.

29. In a baling press, a frame having a compression chamber therein, a block support thereon, a block case normally positioned above said support, means for moving said block case longitudinally of said frame to its block dropping position over said compression chamber, mechanism including a feeder head carried on said frame for packing material in said chamber, and means normally independent of said block case moving means and movable with said feeder head for locking said block case against movement toward block dropping position when said feeder head is in a predetermined position.

30. In a baling press, a frame having a compression chamber therein, a block support thereon, a block case normally positioned above said support, means for moving said block case longitudinally of said frame and over said compression chamber, mechanism including a feeder head carried on said frame for packing material in said chamber, and means normally independent of said block case moving means and movable with said feeder head for locking said block case against movement in a predetermined position of said feeder head and insuring the complete operation of said block case moving means prior to the packing stroke of said feeder head.

31. In a baling press, a frame having a compression chamber therein, block case mechanism movable relatively thereto toward block dropping position, hand operated mechanism operatively connected to said frame and block case mechanism for moving the latter, mechanism including a feeder head pivoted on said frame for packing material in said compression chamber, and means operating therewith for automatically rendering said hand operated mechanism inoperative or insuring the completion of the movement of said mechanism in accordance with the relative positions of said block case mechanism and feeder head.

32. In a baling press, a frame having a compression chamber therein, mechanism including a compressor head movable in said chamber for compressing material therein, a block case carried on said frame and movable relatively thereto to block dropping position over said compression chamber, mechanism for adjusting said block case toward block dropping position, and supplemental automatic means operatively connected to said compressor head controlling the operation of said adjusting mechanism and positioning said block case.

33. In a baling press, a frame having a compression chamber therein, mechanism including a compressor head movable in said chamber for compressing material therein, a block case carried on said frame and movable relatively thereto to block dropping position over said compression chamber, mechanism for adjusting said block case toward block dropping position, and supplemental automatic means operatively connected to said compressor head for withdrawing said block case or assisting in the movement of the same toward block dropping position depending upon the position to which said block case has been adjusted by said adjusting mechanism.

34. In a baling press, a frame having a compression chamber therein, compressing mechanism including a compressor head movable in said chamber, packing mechanism including a feeder head movable into said chamber, operative connections between said compressor head and said feeder head, hand operated block setting mechanism movable relatively to said compression chamber, and a supplemental safety device operating in timed relation to said compressor head and movable with said feeder head automatically controlling the movement of said block setting mechanism.

35. In a baling press, a frame having a compression chamber therein, block case mechanism movable relatively to said frame, mechanism including a compressor head for compressing a bale in said chamber, lever mechanism operatively connected to said frame and block case mechanism normally operative to move the latter toward block dropping position over said chamber, a feeder head pivoted on said frame, means operatively connecting said compressor head and feeder head, and means movable with said feeder head for rendering said lever mechanism inoperative in predetermined positions of said feeder and compressor heads.

36. A baling press having, in combination, a feed hopper, a compression chamber, a bale chamber, a frame including side members extending above said bale chamber, at opposite sides thereof, and a division block carrying case movable longitudinally relative to said bale chamber into said compression chamber and slidably connected with said side frame members.

37. A baling press having, in combination, a feed hopper, a compression chamber, a bale chamber, a division block carrying case movable longitudinally relative to said bale chamber toward and from said feed hopper, and means whereby said case is permitted a rising and falling movement in a vertical plane.

38. A baling press having, in combination, a feed hopper, a compression chamber, a bale chamber, a division block carrying case movable longitudinally relative to said bale chamber toward and from said feed hopper, means whereby said case is permitted a rising and falling movement in a vertical plane, said means including a carrier frame having said case slidably mounted thereon, and a spring connected with said carrier and operative to yieldingly retain said case in an elevated position.

39. A baling press having, in combination, a feed hopper, a compression chamber, a bale chamber, a frame including side members extending above said bale chamber at opposite sides thereof, transversely arranged tie members having opposite ends thereof secured to said side frame members, a division block carrying case, a carrier for said case, said carrier including longitudinally and horizontally arranged bars slidably received by openings at opposite ends of said transverse members, said bars having the front ends thereof arranged vertically, and said case being slidably mounted upon said vertically arranged portions.

40. A baling press having, in combination, a feed hopper, a compression chamber, a bale chamber, a frame including side members extending above said bale chamber at opposite sides thereof, transversely arranged tie members having opposite ends thereof secured to said side frame members, a division block carrying case, a carrier for said case, said carrier including longitudinally and horizontally arranged bars slidably received by openings at opposite ends of said transverse members, said bars having the front ends thereof arranged vertically, said case being slidably mounted upon said vertical portions, a cross tie member secured to the rear ends of said bars, and a tension spring having one end thereof connected with said cross tie member and the opposite end thereof with said case whereby said case is yieldingly retained in an elevated position.

41. A baling press having, in combination, a feed hopper, a compression chamber, a bale chamber, a division block carrying case movable longitudinally relative to said bale chamber toward and from said feed hopper, means whereby said case is permitted a rising and falling movement in a vertical plane, and releasable means for retaining the division block therein.

42. A baling press having, in combination, a feed hopper, a compression chamber, a bale chamber, a frame including side members extending above said bale chamber at opposite sides thereof, a transversely arranged rock shaft journaled in bearings carried by said frame, a feeder arm carried by said rock shaft, a division block carrying case, a carrier for said case mounted thereon in a manner permitting a rising and falling movement thereof, a spring operative to normally retain said case in an elevated position, said case carrier being slidably mounted upon said frame in a manner whereby it may be moved toward or from said feed hopper, means for rocking said shaft, and a contact member carried by said feeder arm and adapted to engage with said case when the latter has reached a predetermined limit of movement toward said feed hopper.

43. A baling press having, in combination, a feed hopper, a compression chamber, a bale chamber, a frame including side members extending above said bale chamber at opposite sides thereof, a transversely arranged rock shaft journaled in bearings carried by said frame, a feeder arm carried by said rock shaft, a division block carrying case, a carriage movable longitudinally along the upper side of said bale chamber and having said case mounted thereon, and a cam secured to said rock shaft and adapted to engage with a part of said carriage.

44. A baling press having, in combination, a feed hopper, a compression chamber, a bale chamber, a frame including side members extending above said bale chamber at opposite sides thereof, a transversely arranged rock shaft journaled in bearings carried by said frame, a feeder arm carried by said rock shaft, a division block carrying case, a carriage movable longitudinally along the upper side of said bale chamber toward and from said feed hopper and having said case mounted thereon, a hand lever mounted upon said frame and operatively connected with said carriage, and a double faced cam secured to said rock shaft and adapted to engage with a part of said carriage during a to and fro movement thereof.

45. A baling press having, in combination, a feed hopper, a compression chamber, a bale chamber, a frame including side members extending above said bale chamber upon opposite sides thereof, a transversely arranged rock shaft journaled in bearings carried by said frame, a feeder arm carried by said rock shaft, a division block carrying case, a carriage movable longitudinally along the upper side of said bale chamber to and from said feed hopper, said carriage including longitudinally and horizontally arranged bars slidably mounted upon said side frame members, said bars having the front ends thereof arranged vertically, said block carrying case being slidably mounted upon the vertical portions of said bars and normally retained in an elevated position by means of a spring connected with said carriage, a bracket member carried by said carriage, a roller journaled upon said bracket, and a double faced cam secured to said rock shaft and adapted to engage with said roller during a to and fro movement of said carriage.

46. A baling press having, in combination, a feed hopper, a compression chamber, a bale chamber, a frame including side members extending above said bale chamber at opposite sides thereof, a transversely arranged rock shaft journaled in bearings carried by said frame, a feeder arm carried by said rock shaft, a division block carrying case, a carriage movable longitudinally along the top of said bale chamber, said carriage including longitudinally and horizontally arranged bars slidably mounted upon said frame, said bars having vertically arranged portions at their forward ends and said case being slidably mounted upon said vertically arranged portions, spring-pressed block retaining latches pivotally mounted upon said case and adapted to engage with a division block inserted therein, pendent links having the upper ends thereof connected with the upper ends of said vertically arranged portions and carrying buffer springs at their lower ends, said latches having ear members provided with slotted openings that receive said links in a slidable manner, said ear members being adapted to engage with said buffer springs in a manner to release said latches when said case reaches a predetermined limit of downward movement thereof.

THOMAS E. TURNER.
ORA J. HEATH.

Witnesses:
W. B. KENDIG,
H. J. GUYTON.

Copies of this patent may be obtained for five cents each, by addressing the "Commissioner of Patents, Washington, D. C."